United States Patent [19]

Bunker

[11] Patent Number: 6,131,932
[45] Date of Patent: Oct. 17, 2000

[54] SUSPENSION AND BRAKING ASSEMBLY

[75] Inventor: Kenneth James Bunker, Rearsby, United Kingdom

[73] Assignee: Federal-Mogul Technology Limited, Rugby, United Kingdom

[21] Appl. No.: 09/319,809

[22] PCT Filed: Dec. 8, 1997

[86] PCT No.: PCT/GB97/03388

§ 371 Date: Jun. 11, 1999

§ 102(e) Date: Jun. 11, 1999

[87] PCT Pub. No.: WO98/25804

PCT Pub. Date: Jun. 18, 1998

[30]        Foreign Application Priority Data

Dec. 12, 1996  [GB]  United Kingdom ................... 9625863

[51] Int. Cl.⁷ ................. B62D 7/18; B60T 1/06
[52] U.S. Cl. ..................... 280/88; 280/124.146
[58] Field of Search ................ 280/88, 124.146

[56]             References Cited

U.S. PATENT DOCUMENTS

| | | | |
|---|---|---|---|
| 2,823,770 | 2/1958 | Helvern | 188/72 |
| 2,940,549 | 6/1960 | Hause et al. | 188/72 |
| 3,146,860 | 9/1964 | Wilson | 188/72 |
| 3,183,999 | 5/1965 | Buyze et al. | 280/88 |
| 3,584,708 | 6/1971 | Heck | 188/71.6 |
| 3,758,129 | 9/1973 | Ishikawa et al. | 280/96.1 |
| 3,788,429 | 1/1974 | Brooks et al. | 188/18 A |
| 3,940,159 | 2/1976 | Pringle | 280/96.1 |
| 3,941,221 | 3/1976 | Pringle | 188/218 XL |
| 3,958,653 | 5/1976 | Arning et al. | 180/157 |
| 4,223,903 | 9/1980 | Grabb et al. | 280/96.1 |
| 4,674,760 | 6/1987 | Goulart | 280/88 |
| 4,705,145 | 11/1987 | Goulart | 188/18 A |

FOREIGN PATENT DOCUMENTS

| | | |
|---|---|---|
| 1 530 510 | 10/1969 | Germany . |
| 727469 | 4/1955 | United Kingdom . |
| 1154786 | 6/1969 | United Kingdom . |

*Primary Examiner*—Kenneth R. Rice
*Attorney, Agent, or Firm*—Synnestvedt & Lechner LLP

[57]            ABSTRACT

A suspension and braking assembly for a wheel of vehicle, comprises a suspension link, a hub mounted on the suspension link for rotation relative thereto, a brake disc mounted for rotation with the hub, friction material pads arranged on opposite sides of the disc, and a piston and cylinder assembly operable to urge the pads against the disc. The link comprises top and bottom mounts for supports. The suspension link also comprises the cylinder of said piston and cylinder assembly which is formed integrally with the remainder of the link. Said disc is mounted for limited movement on the hub in a direction generally parallel to the axis about which the hub rotates.

5 Claims, 4 Drawing Sheets

SUSPENSION AND BRAKING ASSEMBLY

This invention is concerned with a suspension and braking assembly for a wheel of a vehicle.

A conventional suspension and braking assembly comprises a suspension link, and a hub mounted on the suspension link for rotation relative thereto, the hub providing a mounting for the wheel. In order to enable the wheel to be braked, the assembly also comprises a disc brake comprising a brake disc mounted for rotation with the hub, friction material pads arranged on opposite sides of the disc, and at least one piston and cylinder assembly operable to urge the pads into engagement with opposite side surfaces of the disc to brake the hub and hence the wheel. Conventionally, in order to mount the piston and cylinder assembly of the braking system, a slide is bolted to the suspension link and the piston of said piston and cylinder is slidably mounted on this slide. The disc is conventionally rigidly fixed to the hub and wear of the pads and/or disc is accommodated by the sliding movement of the cylinder.

Conventionally, a suspension link also comprises top and bottom mountings for supports of the link. The top mounting may receive a strut of the McPherson type which defines an axis about which the link can be pivoted to turn a wheel mounted on the hub about said axis. Alternatively, the top mounting may receive a top wishbone. The bottom mounting may receive a bottom wishbone. Where the wheel is used to steer the vehicle, the arm also conventionally comprises an arm for connection to a track rod of a steering system of the vehicle by operation of which the link can be turned to steer the vehicle.

U.S. Pat. No. 3,941,221 discloses a suspension and braking assembly which is largely fabricated from sheet metal. The assembly comprises a piston and cylinder assembly having its cylinder welded to a suspension link. The assembly also comprises a brake disc which can slide on a hub of the assembly. However, this assembly would require excessive time to manufacture and has nothing to control the movement of its brake disc on its hub so that it is doubtful whether it would operate well.

The conventional suspension and braking assembly described above operates well but is a relatively heavy item. Accordingly, it is an object of the present invention to provide a suspension and braking assembly which is easy to manufacture and has a reduced weight.

The invention provides a suspension and braking assembly for a wheel of a vehicle, the assembly comprising a suspension link which comprises top and bottom mountings for supports of the link, and a hub mounted on the suspension link for rotation relative thereto, the hub providing a mounting said wheel, the assembly also comprising a brake disc mounted for rotation with the hub, said disc also being mounted for limited movement on the hub in a direction generally parallel to the axis about which the hub rotates, the assembly also comprising friction material pads arranged on opposite sides of the disc, and a piston and cylinder assembly operable to urge the pads into engagement with opposite side surfaces of the disc to brake the hub and hence the wheel, characterised in that the suspension link also comprises the cylinder of said piston and cylinder assembly which is formed integrally with the remainder of the link, and in that the assembly also comprises resilient force applying means acting between the hub and the brake disc to control the movement of the disc on the hub.

In a suspension and braking assembly according to the invention, the cylinder of the piston and cylinder assembly is integral with the suspension link avoiding the slide and mountings for a cylinder on the slide. It is found that this arrangement enables a significant reduction in weight to be achieved, eg a 25% reduction has been found to be possible with one design. The assembly's cost is also reduced. The movement of the disc on the hub accommodates wear of the pads or the disc. The resilient force applying means acts to prevent the disc from slewing on the hub, to take up slack caused by greater thermal expansion of the disc than the hub, and to prevent the disc from rattling on the hub.

Preferably, in an assembly according to the invention, the disc has inwardly-projecting teeth which engage splines on the hub. The splines may be spaced, eg by being arranged in groups, and, said resilient force applying means may comprise springs mounted on the hub between the splines. There are suitably three groups of splines and, hence, three springs which are equally-spaced circumferentially and give a three-point location. The springs are suitably leaf springs secured to the hub at a location centrally between adjacent groups of splines. The leaf springs, then, engage the disc at their ends.

Since conventional disc brakes with a single disc require considerable pressure to be applied between the pads and the disc to enable the required torque to be generated, this high pressure causing wear and being expensive to generate, it is desirable to reduce the pressure required. In order to achieve this, an assembly according to the invention may also comprise a second disc mounted on the hub beside said disc, the second disc also being mounted for limited movement on the hub in a direction generally parallel to the axis about which the hub rotates and being acted upon by said resilient force applying means, the assembly also comprising brake pads mounted between said discs for limited movement in said direction. The second disc enables the braking torque to be shared among four surfaces instead of the conventional two, thereby reducing pressure, heat generated, and wear. It is known to utilise two discs in the disc brake of a wheel; see, eg U.S. Pat. No. 4,598,799 and GB 2 076 087.

Where the wheel is to be used for steering, the link also comprises an arm for connection to a track rod of a steering system of the vehicle.

There now follows a detailed description, to be read with reference to the accompanying drawings, of a suspension and braking assembly which is illustrative of the invention.

The illustrative assembly 10 is a suspension and braking assembly for a front wheel (not shown) of a front wheel-drive car. The assembly 10 comprises a suspension link 12 and a hub 14 mounted on the suspension link 12 for rotation relative thereto.

Figure 1:
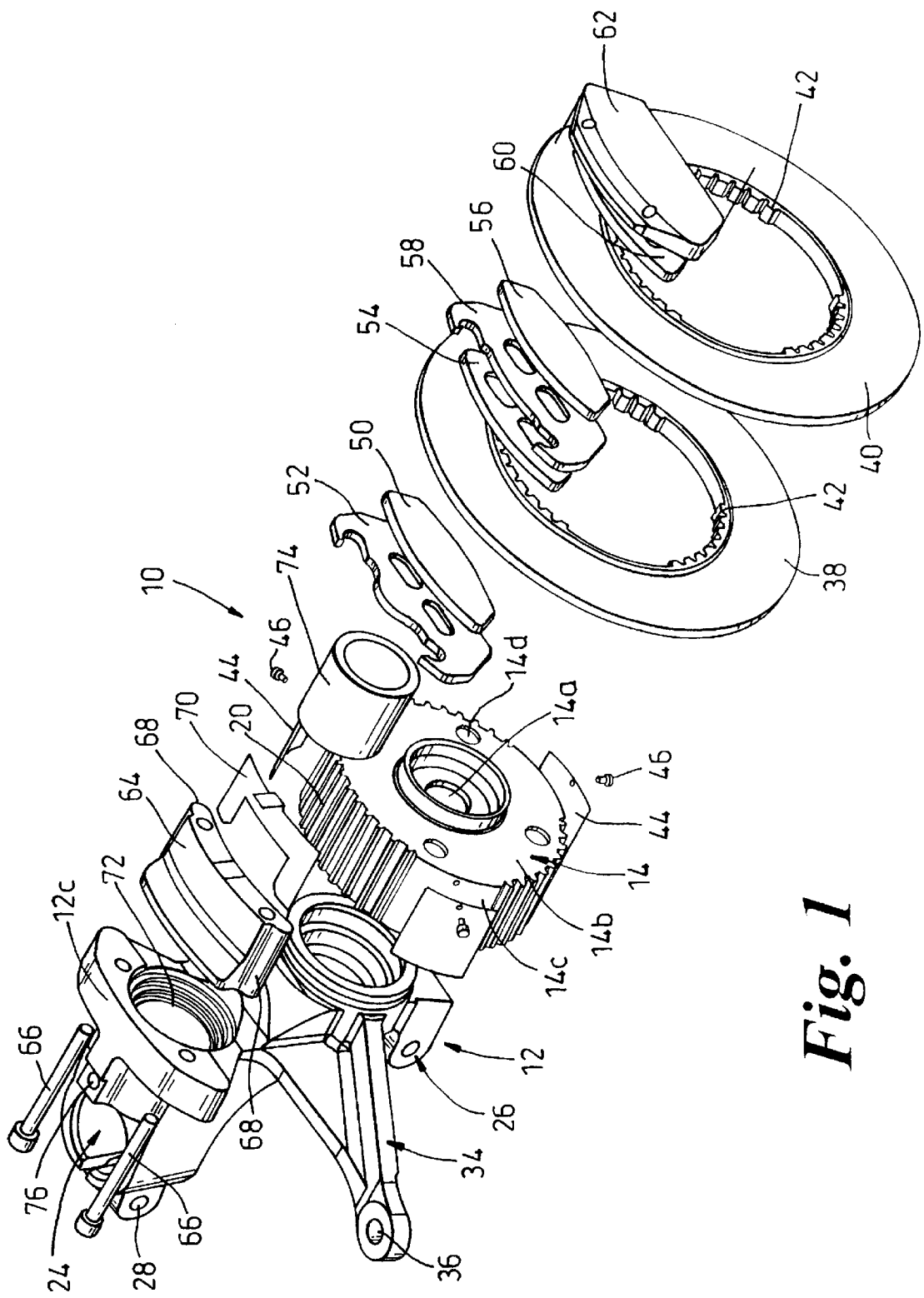
FIG. 1 is an exploded view of the illustrative assembly.
Figures 2, 3:
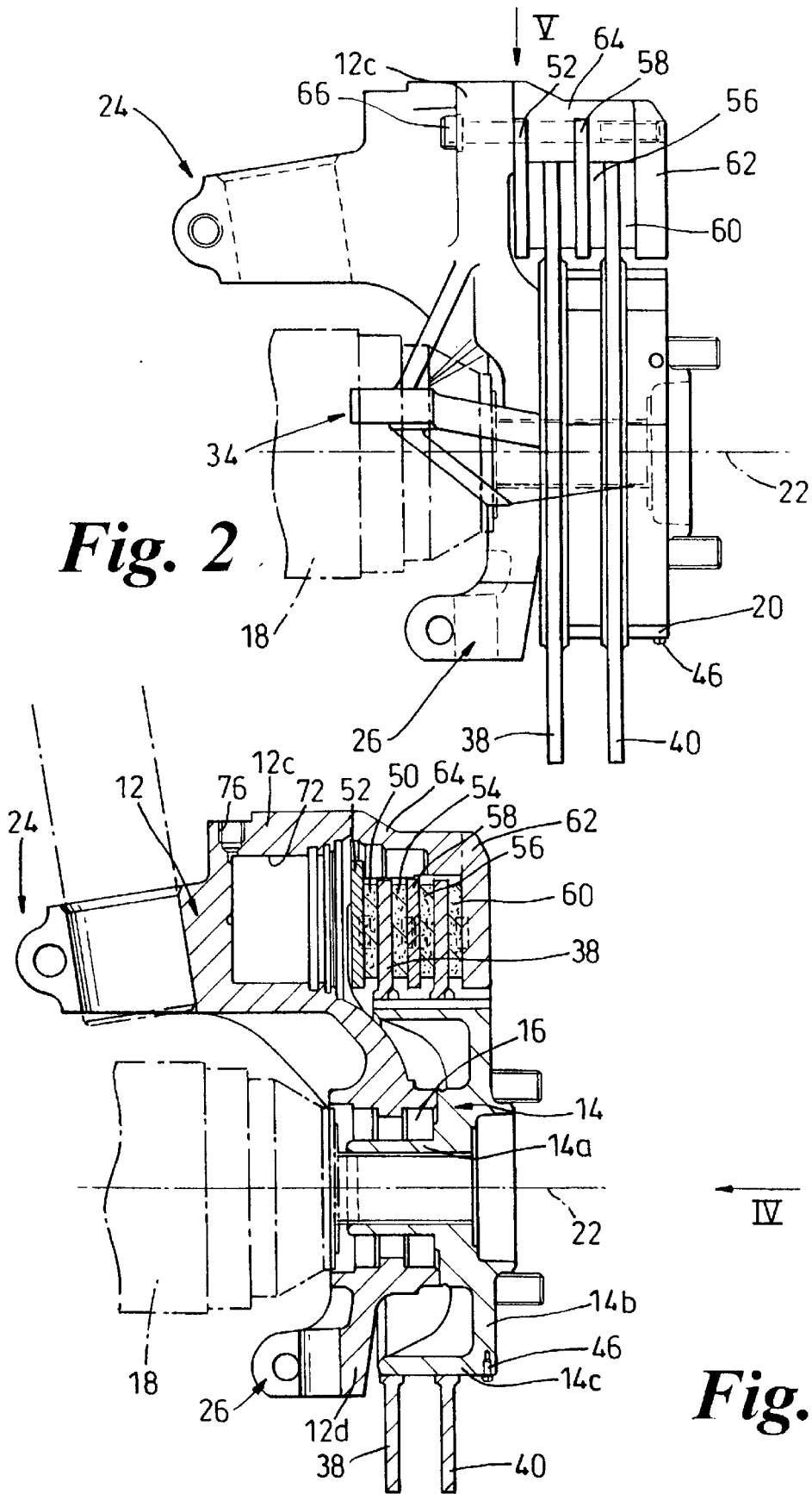
FIG. 2 is a side elevational view of the illustrative assembly.
FIG. 3 is similar to FIG. 2 but shows the illustrative assembly in vertical cross-sectional.

The hub 14 is an integral casting and, as is conventional, has a hollow cylindrical rearward projection 14a which has a splined interior and an exterior which provides a mounting for roller bearings 16 (FIG. 3). A splined projection of a constant velocity joint 18 (shown in broken line in FIG. 3) at the end of a drive shaft is received within the projection 14*a* so that the hub 14 can be rotated on the bearings 16 by the drive shaft. The hub 14 also has an annular disc-like portion 14*b* from which the portion 14*a* projects rearwardly. The hub 14 provides a mounting for the wheel (not shown) which is bolted against a forward surface of the portion 14*b* by bolts received in holes 14*d*. The hub 14 also has a hollow cylindrical rearward projection 14*c* of greater diameter than the portion 14*a*. The portion 14*c* projects from the outer edge of the portion 14*b*. The portion 14*c* has an outer surface provided with splines 20 running parallel to the axis 22 about which the hub 14 rotates. The splines 20 are arranged in three equally circumferentially-spaced groups.

Figure 5:
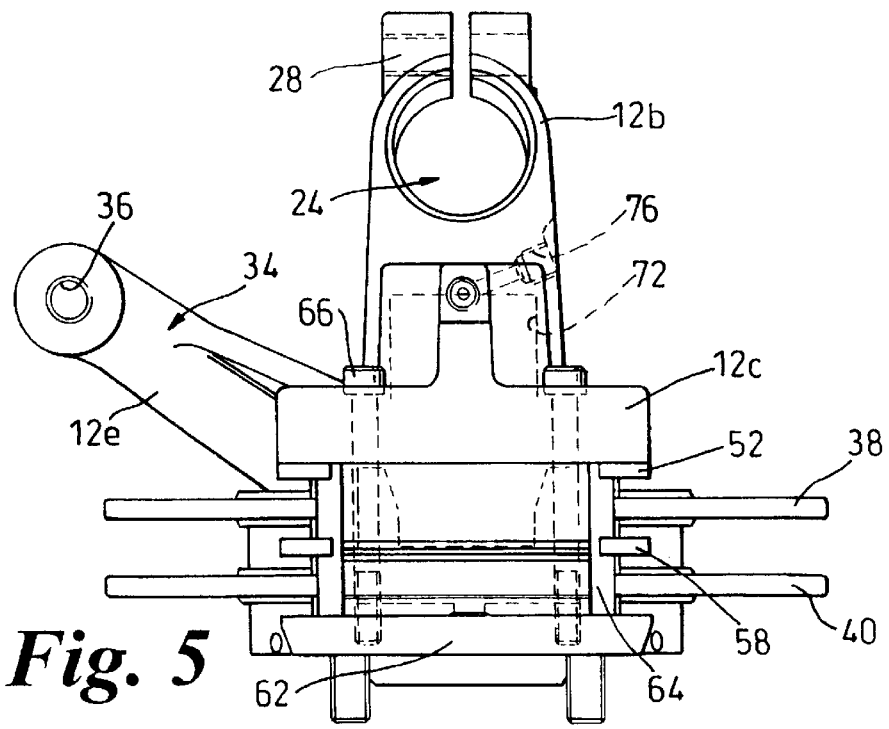
FIG. 5 is a view taken in the direction of the arrow V in FIG. 2.
Figure 6:
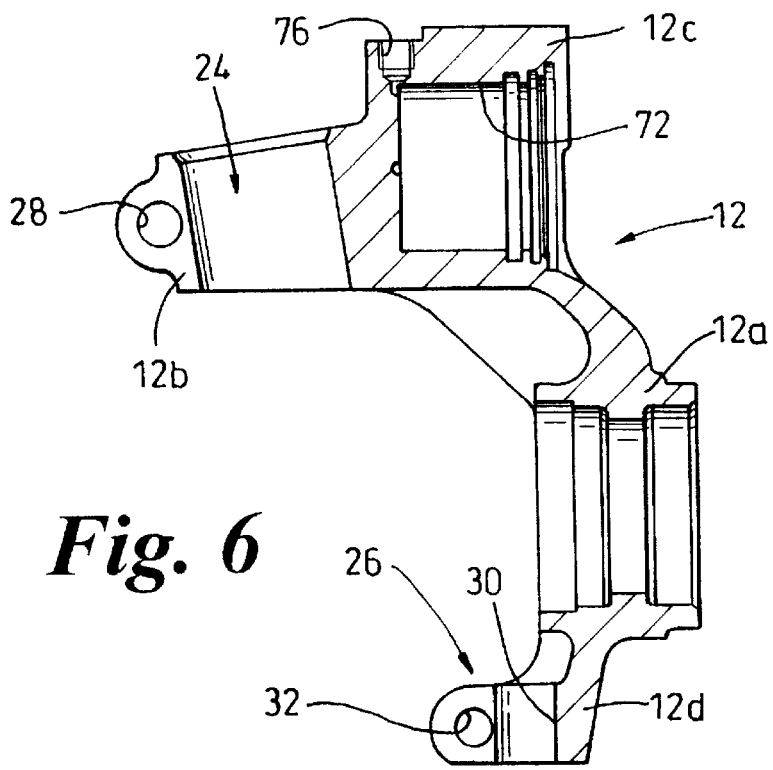
FIG. 6 is a vertical cross-sectional view taken through a suspension link of the illustrative assembly.

The suspension link 12 (see FIG. 6) is an integral casting and comprises a hollow cylindrical portion 12*a* of conventional form which provides a mounting for the bearings 16 so that the hub 14 rotates on the link 12. The link 12 also comprises top 24 and bottom 26 mountings for supports of the link 12. The top mounting 24 is provided by a portion 12*b* of the link 12 which projects rearwardly from a portion 12*c* which projects upwardly from the portion 12*a*. The portion 12*b* is of conventional form and forms two semi-cylindrical arms (see FIG. 5) which together form a clamp which can be tightened by a bolt (not shown) which extends through bores 28 in the arms and across a gap between them. A McPherson strut (not shown) can be clamped between the arms of the portion 12*b* so that the link 12 can pivot about the longitudinal axis of the strut.

The bottom mounting 26 is provided by a portion 12*d* of the link 12 which projects downwardly from the portion 12*a* thereof. This portion 12*d* is of conventional form and has a vertical bore 30, to receive a pin of a ball joint (not shown), and two horizontal bores 32 in which bolts (not shown) can be received to connect the link 12 to a tie bar (not shown).

The link 12 also comprises an arm 34 for connection to a track rod (not shown) of a steering system of the vehicle. This arm 34 is of conventional form and is provided by a portion 12*e* of the link 12 which projects sideways from the portion 12*a* thereof. The arm 34 comprises a vertical bore 36 through which the arm can be pivotally connected to the track rod. In order to steer the vehicle, the track rod is moved to cause the link 12 to pivot on the joint 18 and the mountings 24 and 26.

The illustrative assembly 10 also comprises two brake discs 38 and 40 which are mounted for rotation with the hub 14. The two discs 38 and 40 are identical to one another and are mounted for limited movement on the hub 14 in a direction generally parallel to the axis 22 about which the hub rotates. Specifically, each disc 38 and 40 is in the form of a flat annular plate and has inwardly-projecting teeth 42. The teeth 42 of each disc 38 and 40 are arranged in three groups which match the three groups of splines 20 on the hub 14. The discs 38 and 40 are fitted over the portion 14*c* of the hub 14 so that the teeth 42 mesh with and engage the splines 20 so that rotation of the hub 14 rotates the discs 38 and 40.

Three leaf springs 44 are mounted on the hub 14 to provide resilient force applying means to apply radial forces between the hub 14 and the discs 38 and 40. These radial forces prevent the discs 38 and 40 from tilting on the hub 14, prevent rattling, and control sliding of the discs along the hub. The resilience of the springs 44 allows thermal expansion to be accommodated. The springs 44 are secured by screws 46 to the outer surface of the hub portion 14*c* in the gaps between the groups of splines 20. Each spring 44 engages both of the discs 38 and 40 in the gaps between the groups of teeth 42, giving a resilient three-point mounting for each disc. The discs 38 and 40 can slide on the hub parallel to the axis 22 with the teeth 42 sliding between the splines 20.

The illustrative assembly 10 also comprises friction material pads arranged on opposite sides of each of the discs 38 and 40. These pads comprise a first pad 50 which is mounted on a backing plate 52 and is arranged to engage a side surface of the disc 38, pads 54 and 56 which are mounted on opposite sides of a backing plate 58 and are arranged, respectively, to engage the opposite side surface of the disc 38 and a facing side surface of the disc 40, and a pad 60 which is mounted on a backing plate 62 and is arranged to engage the opposite side surface of the disc 40. The backing plate 62 is fixedly mounted on a guide member 64 which is in turn fixedly mounted on the portion 12*c* of the link 12. Specifically, two bolts 66 pass through bores through the portion 12*c* and the guide member 64, and have threaded ends which are received in threaded bores in the backing plate 62. The guide member 64 provides two guidance surfaces 68 on which the backing plates 52 and 58 slide. The guidance surfaces 68 extend, parallel to the axis 22, along opposite sides of the member 64. Each guidance surface 68 is generally convex and U-shaped in transverse cross-section and is received within concave U-shaped projections of the backing plates 52 and 58. A leaf spring 70 is positioned between the guide member 64 and the backing plates 52 and 58 to prevent rattling.

The illustrative assembly 10 also comprises a piston and cylinder assembly operable to urge the pads 50, 54, 56 and 60 into engagement with opposite side surfaces of the discs 38 and 40 to brake the hub 14 and hence the wheel. The piston and cylinder assembly comprises a cylinder 72 which is defined by the portion 12*c* of the link 12. Thus, the cylinder 72 is formed integrally with the remainder of the link 12. The piston 74 of the assembly projects from the cylinder 72 and engages the backing plate 52 on the opposite side thereof to the pad 50. The piston and cylinder assembly is operated by supplying hydraulic fluid under pressure to a bore 76 in the link portion 12*c* which communicates with the cylinder 72. The piston 74 moves out of the cylinder 72 moving the backing plates 52 and 58 and the discs 38 and 40 until the disc 40 engages the pad 60 which does not move.

Figure 4:
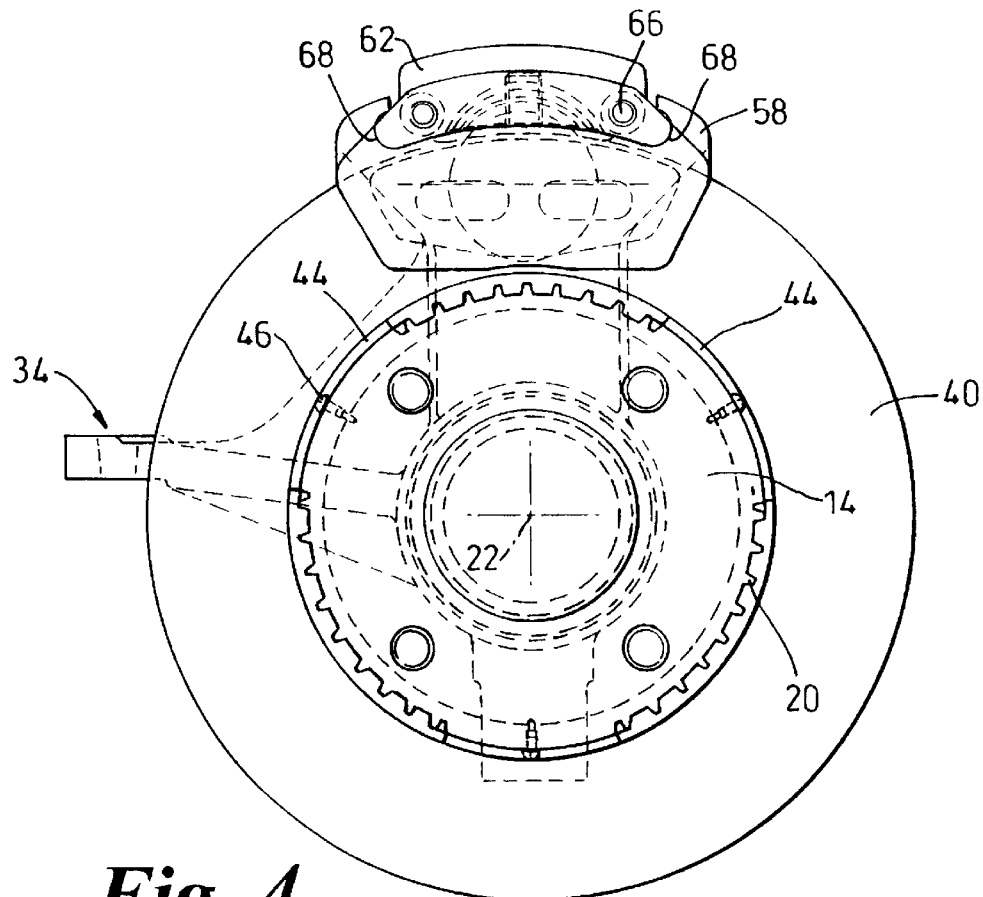
FIG. 4 is a view taken in the direction of the arrow IV in FIG. 2.
Figure 7:
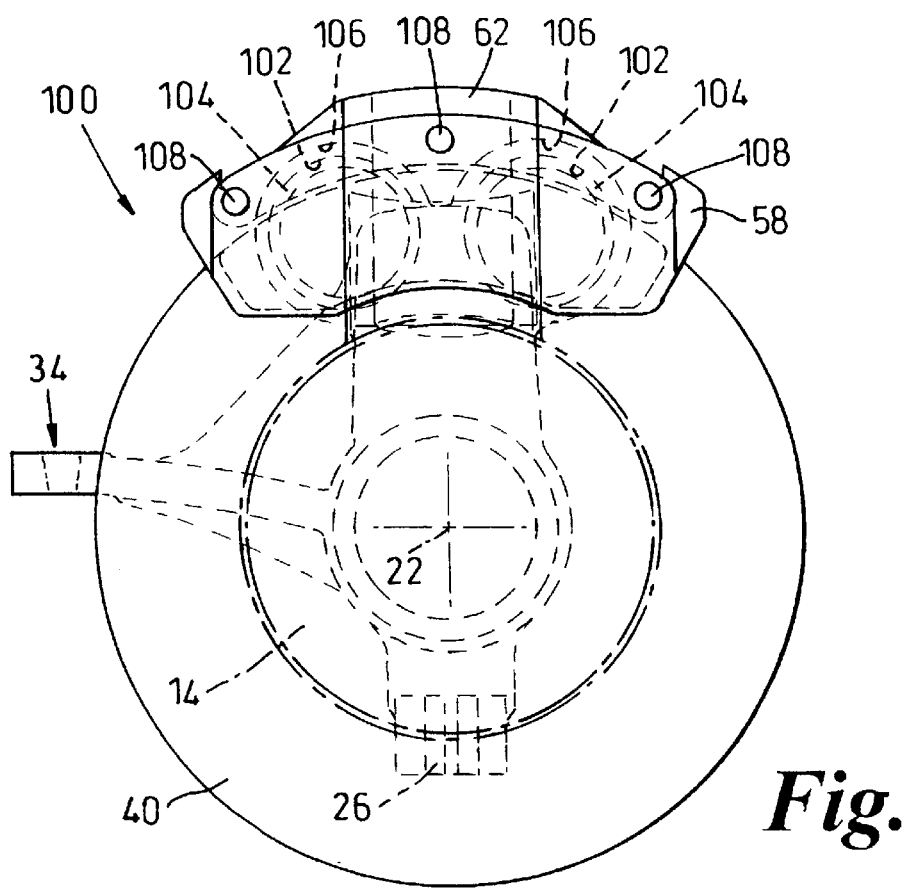
FIG. 7 is a view similar to FIG. 4 but of a modification of the illustrative assembly.

FIG. 7 is similar to FIG. 4 but illustrates a variation 100 of the illustrative assembly 10 in which like parts to those of the assembly 10 are given the same reference numerals and are not further described. The assembly 100 differs from the assembly 10 in that, instead of the cylinder 72, the portion 12*c* of the link 12 has two parallel cylinders 102 formed therein. In this case, each of the cylinders 102 has a smaller transverse cross-sectional area than the cylinder 72 but the total area of the cylinders 102 is greater. Each of the cylinders 102 has a piston 104 therein and the pistons 104 cooperate in pressing the backing plate 52. In order to accommodate the two piston and cylinder assemblies, the guide member 64 is modified to arch over the pistons 104 as shown at 106 and the bolts 66 are replaced by three bolts 108. The use of two piston and cylinder assemblies enables greater force to be applied for the same pressure in the cylinders (or the same force to be applied for lower pressure) and this force can, on average, be applied at a greater distance from the axis 22. If desired, the two cylinders can be of different diameters, eg with the leading cylinder, in the normal direction of rotation, being of greater diameter.

What is claimed is:

1. A suspension and braking assembly for a wheel of a vehicle, the assembly comprising a suspension link which comprises top and bottom mountings for supports of the link, and a hub mounted on the suspension link for rotation relative thereto, the hub providing a mounting for said wheel, the assembly also comprising a brake disc mounted for rotation with the hub, said disc also being mounted for limited movement on the hub in a direction generally parallel to the axis about which the hub rotates, the assembly also comprising friction material pads arranged on opposite sides of the disc, and a piston and cylinder assembly operable to urge the pads into engagement with opposite side surfaces of the disc to brake the hub and hence the wheel, wherein the suspension link also comprises the cylinder of said piston and cylinder assembly which is formed integrally with the remainder of the link, and wherein the assembly also comprises resilient force applying means acting between the hub and the brake disc to control the movement of the disc on the hub.

2. An assembly according to claim 1, wherein the disc has inwardly-projecting teeth which engage splines on the hub.

3. An assembly according to claim 1, wherein the splines are spaced and said resilient force applying means comprises springs mounted on the hub between the splines.

4. An assembly according to claim 1, wherein the assembly also comprises a second disc mounted on the hub beside said disc, the second disc also being mounted for limited movement on the hub in a direction generally parallel to the axis about which the hub rotates and being acted upon by said resilient force applying means, the assembly also comprising brake pads mounted between said discs for limited movement in said direction.

5. An assembly according to claim 1, wherein the link also comprises an arm for connection to a track rod of a steering system of the vehicle.

* * * * *